United States Patent

[11] 3,610,815

[72] Inventors George K. Gould
Roslyn, N.Y.;
Robert W. Lieberman, Paterson, N.J.;
Armando Belmares-Sarabia, Long Beach, N.Y.

[21] Appl. No. 17,510
[22] Filed Mar. 9, 1970
[45] Patented Oct. 5, 1971
[73] Assignee Teletronics International, Inc.
New York, N.Y.

[54] MOTION PICTURE FILM COLOR CORRECTION SYSTEM AND METHOD
21 Claims, 1 Drawing Fig.

[52] U.S. Cl. .......... 178/5.2 A, 178/5.4 CD, 178/6.6 R
[51] Int. Cl. .......... H04n 9/02, H04n 5/76
[50] Field of Search .......... 178/5.2 R, 5.2 A, 5.2 D, 5.4 CD, 5.4 R, DIG. 28, 6.7 A, 6.6 R

[56] References Cited
UNITED STATES PATENTS

| | | | |
|---|---|---|---|
| 2,947,810 | 8/1960 | Horsley .......... | 178/6.7 CR |
| 3,005,042 | 10/1961 | Horsley .......... | 178/6.7 CR |

OTHER REFERENCES

Back Stage, page T- 2, 09131968 copy in 178- 6.7 CR

*Primary Examiner*—Robert L. Richardson
*Attorney*—Curtis, Morris and Safford

ABSTRACT: A system and method for producing color-corrected video tape recordings from color motion picture film. The location of scene changes is marked on the film. The film is run through a motion picture projector which stops automatically when it senses one of the markings denoting a scene change. The color images from the projector are converted into electrical signals representing the color components, and the electrical signals are recombined and displayed as a composite picture on a color video picture tube which is used as a control monitor. Each time the projector stops for a scene change, the electrical color component signals are adjusted by the operator until the color in the picture on the control monitor is correct, and the adjustments are stored. Then the projector is restarted and automatically stops at the next scene change, and the next scene is corrected and the correction signals are stored as before. This process is repeated until all of the scenes have been corrected and the correction signals for each scene have been stored. Then the film is rerun through the projector, without stopping, while the stored signals are read out of storage in sequence and the corrected component signals are recorded on video tape.

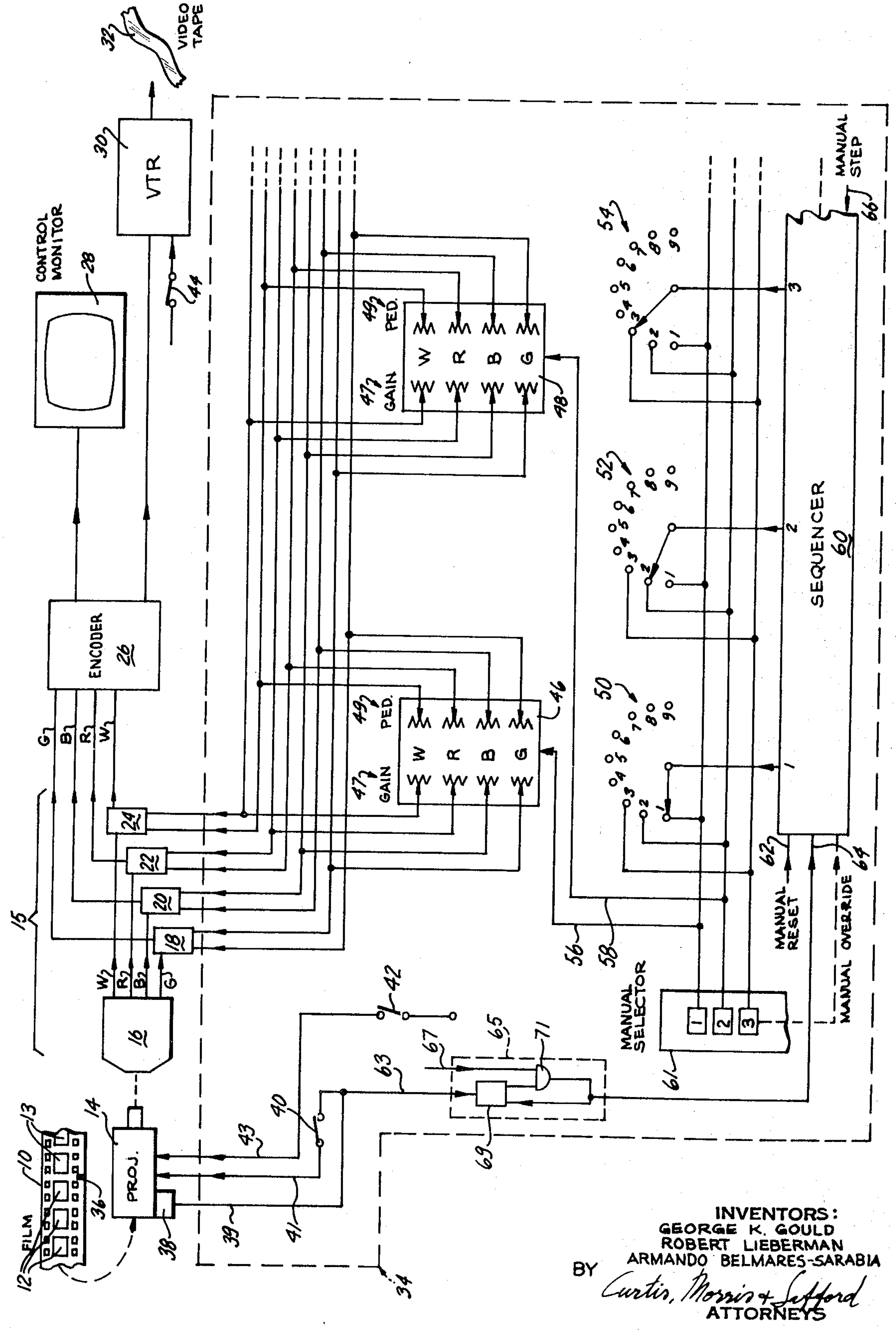
INVENTORS:
GEORGE K. GOULD
ROBERT LIEBERMAN
ARMANDO BELMARES-SARABIA
BY Curtis, Morris & Safford
ATTORNEYS

MOTION PICTURE FILM COLOR CORRECTION SYSTEM AND METHOD

This invention relates to systems and methods for color correcting motion picture film; more particularly, this invention relates to systems and methods for producing color-corrected video tape recordings of color motion picture film.

In the usual process for preparing filmed programs and commercials for showing on television, the scenes often are photographed individually, often out of sequence. These scenes often are filmed in different places and under different lighting and conditions. Also, sometimes more than one camera is used in the filming. Film from the different scenes or cameras is edited and printed to form a complete program or commercial. Each change of place or camera and/or lighting conditions creates a scene change on the resulting film. Each different scene can have a different degree of color imbalance.

Next, the edited film is run through a "film chain" which includes a projector. The projector sends film images to a converter, usually called a "film camera," which converts the images into separate electrical signals representing the color components and the luminance of the images. The color components are then recombined into a television picture signal which is displayed on a video picture tube called a "monitor." An operator watches the monitor, and as a scene changes, he adjusts manually the values of the various electrical color components of the picture so as to bring it into proper color balance and give it a pleasing appearance. Meanwhile, the corrected picture signals are recorded on video tape by means of a video tape recorder.

A major problem with the foregoing procedure is that it is crude and inaccurate. The operator cannot apply the color corrections immediately upon seeing a scene change because his reaction time is limited. Moreover, if he were to change the color controls abruptly upon seeing a scene change, the picture would have a displeasing appearance. Therefore, the operator makes the changes gradually, over a period of 1 or 2 or more seconds, for example. Even if this is done, only very minor color corrections are possible without the changes in color causing an undesirable appearance. In many programs, and especially in commercials, scenes frequently last for only a short time. Often the length of the scene is shorter than the correction time required by the operator, with the result that the color imbalance for that scene is corrected either very little or not at all. The resulting television program can be quite unattractive in appearance.

One alternative to this rather crude prior video color correction scheme has been to color-correct the film in the film printing process itself. However, this is a slow and relatively expensive alternative and rarely achieves a completely satisfactory color correction.

In accordance with the foregoing, it is an object of the present invention to provide a motion picture film color correction system and method which is highly accurate, and yet is relatively rapid and inexpensive to use.

In accordance with the present invention, the foregoing objects are met by the provision of a system and method in which the motion picture projector is stopped adjacent each scene change, the electric color correction signals are set and stored, the projector is run to the next scene change, the further corrections are set and stored, and the process is repeated as many times as necessary. Then the corrected stored signals are read out of storage and utilized.

Other objects and advantages of the invention will be set forth in or apparent from the following description and drawings.

The single FIGURE of the drawings is a schematic circuit diagram of a color correction system constructed in accordance with the present invention. In this system, color motion picture film 10 bearing color images 12 and 13 is processed by a conventional motion picture film projector 14.

Images from the projector 14 are projected into a conventional "film camera" unit 15. The film camera unit 15 includes an image converter 16 which converts each color image into four electrical output signals appearing on four output leads "W," "R," "B" and "G." Output signals sent over the lead "G" represent the green components of the projected image. Similarly, the signals delivered through the "R" and "B" leads represent, respectively, the red and blue components of the image. Finally, the signal sent over the lead "W" represents the luminance of the image.

Each of the output signals from the converter 16 is sent to an amplifier unit 18, 20, 22 or 24 which includes a preamplifier and a processing amplifier whose characteristics can be changed by means of conventional "gain," "pedestal" and "-gamma" potentiometers (not shown), as is well known in the art. The output signals from the amplifier units 18, 20, 22 and 24 are delivered to a conventional encoder 26 which recombines the component signals into a composite color video picture signal. This composite signal is delivered to a conventional control monitor unit 28 which displays a composite picture on the screen of a video tube. A video tape recorder 30 records the composite color signal on video tape 32.

In accordance with the present invention, a special storage-control unit 34 (indicated in dashed outline) is provided.

The unit 34 stops and starts the projector 14 in a controlled sequence, stores color correction signals, and reads them out of storage into the video tape recorder 32 to record the corrected composite video program signals.

The images 12 on the film 10 are from one scene, and the images 13 are from another scene. Scene changes are marked on the film by placing markers 36 at the location of each such scene change. Such markers can be any one of a number of well-known film marking devices, such as a metal foil tab which is physically secured to the film. A conventional marking detector device 38 is provided with the projector 14. The detector device may be a conventional radiofrequency proximity detector, or a magnetic head, each of which will detect the passage of a metallic indicator 36 as the film is moving through the projector. The detector 38 produces an electrical signal when it detects an indicator 36 and sends that signal over an output lead 39 through an initially closed switch 40 back to the projector 14 to stop the projector. Another switch 42 can be operated to supply a signal over a lead 43 to start the projector again.

Connected to the amplifier units 18, 20, 22 and 24 are a plurality of identical potentiometer-storage units 46 and 48. Only two such storage units are shown, but in practice as many storage units as desired can be used. Each of the storage units 46 and 48 has two groups 47 and 49 of potentiometers, each group having one potentiometer which is connected to one of the amplifier units 18, 20, 22 or 24, and is marked with the letter "W," "R," "B" or "G," according to the amplifier unit to which it is connected. Each of the potentiometer in row 47 can be adjusted to adjust the gain of the particular color component with which it is associated, and each of the potentiometers 49 can be adjusted to change the "pedestal" voltage of each such color component signal. The potentiometers 47 and 49 in each unit 46 and 48 are connected in the place usually taken by a set of adjustment potentiometers which is provided in the conventional film camera unit 15 and which has been described above.

If desired, a third row of potentiometers (not shown) can be provided in each storage unit in order to similarly control the "gamma" factor of the system.

A plurality of multiple-contact switches 50, 52 and 54, and a sequencing device 60 are provided as programming and readout means for the control circuit 34.

The sequencer 60 preferably is a conventional BCD counter which receives an input pulse over an input lead 64 from a synchronizer circuit 65 each time a scene-change marker 36 is detected. The synchronizer circuit 65 receives the output signal from the marking detector device 38, over an input lead 63 and also receives the vertical synchronization signal from the image converter 16 over an input lead 67. The synchronization circuit stores the marking detector signal. Then, when it receives the vertical synchronization signal, it develops an output signal which is delivered over lead 64 to the sequencer 60. In this manner, during readout, changes to a new set of adjustment signal values will occur only during the vertical retrace blanking interval of the scanning process in image converter 16.

The synchronizer 65 preferably includes a flip-flop 69 which receives the detector signal and, in response, applies an output signal to one input lead of an AND gate 71. The synchronization signal lead 67 is connected to the other input of the AND gate 71. When the gate 71 has received both the detector signal and the synchronization signal, it delivers an output signal over lead 64 to the sequencer 60. That output signal also is conducted back to the flip-flop 69 to reset it and prepare it for the receipt of another detector signal.

The sequencer (counter) initially produces an output signal over lead number 1 which is connected to the wiper arm 51 of the switch 50. Then, when the next input signal is received, the counter steps to the second position in which an output signal is produced only on output lead number 2 which is connected to the wiper arm 53 of switch 52. Subsequently, upon the receipt of another scene change input signal, the counter steps to position number 3, thus producing an output signal on the wiper arm 55 of switch 54. Although there are only three switches 50, 52 and 54 shown in the drawing, as many switches as needed can be provided. The counter 60 has a capacity equal to the number of multiposition switches, and sequentially energizes each of its output leads in the manner described above. When the counter is full, it automatically resets to zero. Alternatively, the counter can be manually reset in a conventional manner by supplying a reset signal over an input lead 62. Also, the counter can be stepped by means of a conventional manual step input signal supplied over a lead 66. A conventional stepping switch or stepping register can be used as an alternative to the counter 60.

The output signal on a particular lead of the sequencing device 60 is delivered to one of the storage devices 46, 48, depending upon which contact the contact arm of the particular switch in question is set at. For example, the number 1 output lead of the device 60 is connected through contact arm 51 to contact 1 which is connected through lead 56 to storage device 46. In this manner a voltage is applied from the sequencer 60 to each of the potentiometers 47 and 49 in the storage device 46, thus enabling the first storage device 46. However, if the arm 51 were contacting contact number 2 in switch 50, the second storage device 48 would have been enabled instead of the first device 46. Each switch 50, 52 or 54 operates similarly to energize one of the storage devices, depending upon the contact to which the switch has been set.

A manual selector device 61 is provided in addition to the sequencer 60. The manual selector device 61 has a plurality of switches 1, 2, 3, etc., one for each storage device 46, 48, etc. When any of the manual selector switches is actuated, a voltage is supplied over one of the leads 56, 58, etc. to the corresponding storage device 46. For example, actuation of switch number 1 energizes the first storage 46 device by means of a signal supplied over a lead 56; and actuation of switch number 2 sends a signal over lead 58 to the second storage device 48. Of course, conventional override means are provided for overriding the sequencer 60 when the manual selector device is being used.

The color correction system and method of the present invention operate as follows: The film runs through the projector 14 until the first scene change is reached. A marker 36 causes a signal to be sent over leads 39 and 41 through closed switch 40 to the projector to stop it. During the correction and storage steps of the process, it usually is preferred to operate by means of the manual selector 61 rather than the sequencing device 60, so that the former is enabled and the latter is disabled. Manual selector button number 1 is depressed, and the first storage device 46 is energized. A composite color picture representing one frame of the new scene on the film is displayed on the control monitor 28. If the color of the picture is satisfactory, no adjustments need be made. However, if color corrections must be made, the various potentiometers in storage unit 46 are adjusted until a correct composite color picture is produced. The adjustment of the potentiometers, in essence, constitutes storage of a correction signal. Thus, the device 46 is, in effect, an analog storage device. Since the first color correction was made in the first storage device 46, the first programming switch 50 is set to its contact member number 1.

At this time, the video tape recorder 30 is inoperative because it has not yet been turned on by means of its starting switch 44. Thus, nothing is being recorded on the video tape 32.

Once the storage of the first correction signal is complete, the operator actuates the starting switch 42 to start the projector 14 once again. The projector continues running until it detects the next scene change marker 36 and then stops again. Manual selector button no. 1 still is energized. If the color corrections provided by storage unit 46 are not satisfactory, selector button no. 2 is depressed, and the second storage unit 48 is energized. The potentiometers in unit 48 are adjusted until the picture is satisfactory. Also, the wiper arm 53 of switch 52 is set to contact no. 2 to indicate that the second storage unit has been used for the second scene.

The foregoing procedure is repeated for each successive scene change, with the wiper arm of each rotary switch being set by the operator to a contact corresponding to a particular storage device for that scene.

In accordance with another feature of the present invention, advantage is taken of the fact that certain of the scenes may require identical color corrections. Such might be the case if there is repeated reuse of a certain camera in a certain location to film different scenes. If two or more scenes can be corrected by means of the same potentiometer settings, additional adjustment time is not needed; all that need be done is to set the rotary switch corresponding to that scene at the identification number of the storage device having the proper correction settings. Not only does this speed the correction process, but it reduces the number of different storage units required.

When all of the scenes have been corrected and the rotary switch positions have been set, the manual selector 61 is disabled and the sequencer 60 is enabled, the switch 40 is opened, in order to disable the projector stopping circuit, and the switch 44 is closed in order to turn on the video tape recorder 30. Then, the film is run through the projector 14 once again, this time without stopping. As each marker 36 passes the detector device 38, a signal is delivered over lead 64 to the sequencing device 60 to step it one step. Each time it steps, the correction signal stored in the storage device corresponding to the position of the wiper arm of the rotary switch 50, 52, or 54, etc., will be delivered to the amplifier units 18, 20, 22 and 24, and the corrected color signals will be recorded on the video tape 32 (the signal also will be displayed on the control monitor 28 at the same time). As each successive scene-change signal is received by the sequencing device 60, it steps one step and reads out of storage the correction signals corresponding to that particular scene. Thus, a fully color-corrected video tape recording is produced.

The timing of the stopping of the projector 14 is such that the particular image or frame which is displayed on the monitor 28 while the projector is stopped is several frames beyond the actual beginning of the new scene. This is desirable because there is thus positive assurance that the frame being viewed on the monitor 28 is from the new scene, not from the old.

The projector 14 can be any of a number of well-known commercially available projectors such as the "PA 200" 35 millimeter projector sold by General Precision Laboratories, Inc. Similarly, the "film camera" 15 can be any of several commercially available devices, such as the "PE 240" film camera which is sold by the General Electric Company. A suitable encoder unit 26 is sold by the Cohu Electronics Co., and a suitable video tape recorder is the "VR 2000 B" recorder sold by Ampex Corporation.

The control potentiometers 47 and 49 also are conventional. Preferably, they are of the variety requiring several complete revolutions, e.g., 10 revolutions, to traverse from one end of the potentiometer to the other so as to provide relatively precise control of the settings.

The switches 50, 52 and 54 are conventional, and preferably are of the "thumb-wheel" variety. The sequencing device 60 is a conventional BCD counter which can be purchased commercially or constructed of discrete components.

The above-described system and method have the distinct advantage that precise corrections of color film can be made rapidly and inexpensively. The overall visual appearance of the corrected video tape scenes compares quite favorably with motion picture film corrected by the more time-consuming and expensive chemical and optical processing.

The foregoing system uses analog storage of correction signals. However, it should be understood that it is within the scope of this invention to store such signals digitally, the choice of digital or analog storage being made on the basis of the requirements of the particular color correction efforts being undertaken. Furthermore, the process of the present invention can be performed by a suitably preprogrammed general purpose digital computer.

The above description of the invention is intended to be illustrative and not limiting. Various changes or modifications in the embodiments described may occur to those skilled in the art and these can be made without departing from the spirit or scope of the invention as set forth in the claims.

1. In a system for modifying image-representing indicia recorded on a recording medium, display means for successively displaying images from said recording medium, means for detecting locations on said recording medium at which color changes are to be made, means for stopping said display means in response to the detection of such a location, means for providing adjustment signals for adjusting the electrical characteristic signals representing said images, storage means for storing the adjustment signals for each of said locations, and readout means for reading said adjustment signals out of said storage means in a predetermined sequence.

2. A system as in claim 1 in which said recording medium is motion picture film, and including means for recording on video tape signals which are a function of the adjusted electrical characteristic signals.

3. A system as in claim 2 in which said display means includes a motion picture projector, means for marking scene changes on said film, and scene-detecting means comprising means for detecting the scene-change markings on said film and stopping said projector in response thereto.

4. A system as in claim 1 in which said storage means comprises a plurality of groups of potentiometers, there being at least one potentiometer in each group for each of said electrical characteristics.

5. A system as in claim 1 including means for developing electrical indicating signals indicating scene change locations, and in which said readout means includes means responsive to said indicating signals for addressing selected areas of said storage means to readout said adjustment signals in a predetermined sequence.

6. A system for producing color-corrected video tape recordings of color motion pictures, said system comprising conversion means for producing a plurality of electrical signals representative of the color components of each image on motion picture film, color picture tube means for displaying each image in color, correcting means for changing the magnitude of each of the color component signals of each such image, said conversion means including a motion picture film projector, detecting means for detecting a scene change on said film and producing a corresponding electrical scene change signal, storage means for storing correction signals for the electrical color component signals, readout means for reading said correction signals out of storage under the control of said scene change signal, and means for recording the corrected signals on video tape.

7. A system as in claim 6 in which said storage means includes a plurality of different addressable storage regions, and said readout means includes means for reading-out the contents of said storage regions in a predetermined sequence in response to said scene change signals received from said detecting means.

8. A system as in claim 7 in which each of said storage regions comprises a group of potentiometers, there being in each group at least one potentiometer for each color component signal.

9. A system as in claim 7 including programming means having switch means with selectable positions for enabling selected ones of said storage regions, and stepping register means for enabling said switch means in sequence.

10. A system as in claim 9 in which each of said storage regions comprises a group of potentiometers, there being in each group at least one potentiometer for each color component signal, and including manual means for overriding said stepping register means and selectively energizing said potentiometer groups.

11. A method of producing color-corrected video tape from color motion picture film, said method comprising the steps of producing electrical color component signals representing the color components of the images on said film, displaying said images in rapid sequence, automatically stopping the displaying step in response to electrical sensing of a scene change on said film so as to display a single one of said images near the beginning of a new scene, adjusting said color component signals to provide color balance, storing color component adjustment signals, repeating said displaying, stopping and storage steps, and reading said adjustment signals out of storage and using them to modifying said color component signals.

12. A method as in claim 11 including the steps of marking said scene changes.

13. A method as in claim 11 including the steps of programming the readout of the stored signals, sensing scene changes on said film, and timing the program in synchronism with the sensing of scene changes.

14. A method as in claim 11 in which said adjustment color component signals are stored in analog form.

15. A method of color-correcting uncorrected electrical video color component signals, said method comprising the steps of sequentially displaying video pictures composed from said uncorrected signals, stopping the sequential display step to provide a stationary display of a picture at the beginning of a scene requiring color correction, locating scene changes by providing means for developing electrical scene-location signals, storing color component adjustment signals, repeating said displaying, stopping, locating and storing steps for each other scene requiring color correction, and reading said adjustment signals out of storage under the control of said scene location signals and using said adjustment signals to modify said color component signals.

16. A method as in claim 15 in which the image representations forming said scenes are recorded on a record medium, including the steps of reading said representations from said medium a first time while converting said images into said uncorrected color component signals, and performing said displaying, stopping, locating and storing steps, and reading said representations from said medium a second time while utilizing the scene-location signals to shift the portion of storage from which said adjustment signals are read.

17. In a color-correcting device including means for producing electrical image signals representative of the color components of images stored by a recording medium, the improvement consisting of means for developing electrical indicating signals indicating the location of scene changes on said recording medium, means for providing adjustment signals for adjusting the electrical color characteristics of said image signals, storage means for storing the adjustment signals for each scene, and readout means for reading the adjustment signals out of said storage means in a predetermined sequence under the control of said indicating signals.

18. Apparatus as in claim 17 in which said storage means includes a plurality of different randomly accessible storage regions, means for storing adjustment signals for different scenes in different ones of said storage regions, said readout means including addressing means for selectively addressing said regions in accordance with said indicating signals.

19. Apparatus as in claim 18 in which said addressing means includes means for repeatedly addressing one of said regions to repeatedly readout its contents.

20. Apparatus as in claim 18 in which said readout means includes programming means for programming the operation of said addressing means, said addressing means including sequencing means for sequentially enabling different portions of said programming means in accordance with the receipt of said indicating signals.

21. Apparatus as in claim 17 including means for encoding the adjusted electrical color characteristic signals, and a video recorder for recording the signals from said encoding means.